US006792149B1

(12) United States Patent
Florencio

(10) Patent No.: US 6,792,149 B1
(45) Date of Patent: Sep. 14, 2004

(54) METHOD AND APPARATUS FOR RESIZING AN IMAGE FRAME INCLUDING FIELD-MODE ENCODING

(75) Inventor: Dinei Afonso Ferreira Florencio, Plainsboro, NJ (US)

(73) Assignee: Sarnoff Corporation, Princeton, NJ (US)

( * ) Notice: Subject to any disclaimer, the term of this patent is extended or adjusted under 35 U.S.C. 154(b) by 893 days.

(21) Appl. No.: 09/160,790

(22) Filed: Sep. 25, 1998

Related U.S. Application Data

(60) Provisional application No. 60/084,632, filed on May 7, 1998.

(51) Int. Cl.[7] .............................. G06K 9/36; G06K 9/32
(52) U.S. Cl. ........................ 382/233; 382/299; 382/250
(58) Field of Search ................................ 348/400, 401, 348/402, 403, 404, 405, 406, 407, 408, 409, 410, 411; 382/232, 233, 234, 235, 236, 250, 253, 248, 276, 298, 299; 375/240.03, 240.18, 240.2, 240.22, 240.25

(56) References Cited

U.S. PATENT DOCUMENTS

| | | | | |
|---|---|---|---|---|
| 5,262,854 A | | 11/1993 | Ng .............................. | 358/133 |
| 5,355,328 A | | 10/1994 | Arbeiter et al. ........... | 364/724.1 |
| 5,485,279 A | * | 1/1996 | Yonemitsu et al. ......... | 348/411 |
| 5,635,985 A | * | 6/1997 | Boyce et al. ............... | 348/402 |
| 5,666,209 A | * | 9/1997 | Abe ........................... | 386/109 |
| 5,737,019 A | * | 4/1998 | Kim ........................... | 348/390 |
| 6,067,320 A | * | 5/2000 | Takahashi et al. .......... | 375/240 |

FOREIGN PATENT DOCUMENTS

| | | | |
|---|---|---|---|
| DE | 0 753 967 A2 | 6/1996 | ............ H04N/7/24 |
| EP | 0 740 269 A | 10/1996 | ............. G06T/9/00 |

OTHER PUBLICATIONS

"HDTV Down–Conversion Decoder", J. Bao et al., IEEE Transactions on Consumer Electronics, vol. 42, No. 3, Aug. 1996, pp. 402–409.
Bhaskaran V: "Mediaprocessing in the Compressed Domain" Digest of Papers. Compcon, Jan. 1, 1996, pp. 204–209, XP000578934 *p. 206, left–hand column, paragraph 2–p. 207, left–hand column, paragraph 1*–3*.
Shih–Fu Chang et al: "Manipulation and Compositing of MC–DCT Compressed Video" IEEE, Journal on Selected Areas in Communications, vol. 13, No. 1, Jan. 1, 1995, pp. 1–11, XP000492740 ISSN: 0733–8716 *p. 3, right–hand column, paragraph C. *p. 5, left–hand column, paragraph E.*.
European Search Report for European patent application EP 9 9 30 3309.1–2201 corresponding to US 09/160,170.

* cited by examiner

Primary Examiner—Andrew W. Johns
Assistant Examiner—Amir Alavi
(74) Attorney, Agent, or Firm—William J. Burke

(57) ABSTRACT

A method and apparatus for reducing information artifacts imparted to a decoded video information stream by an MPEG-like decoder utilizing discrete transform (DCT) domain compression to produce a size-reduced reference image information frame. Specifically, the invention responsively selects one of a plurality of pre-defined DCT coefficient matrices in response to the amount of compression to be imparted to the reference image information frame, and the presence or absence of field-mode encoding the reference image information frame.

32 Claims, 6 Drawing Sheets x = ORIGINAL SAMPLES FOR FRAME-DCT
z = ORIGINAL SAMPLES FOR TOP FIELD-DCT
y = ORIGINAL SAMPLES FOR BOTTOM FIELD-DCT
* = 4 x 4 IDCT SAMPLES FOR "x"
• = 4 x 4 IDCT SAMPLES FOR "y"
♦ = 4 x 4 IDCT SAMPLES FOR "z"

x = ORIGINAL SAMPLES FOR FRAME-DCT
* = 4 x 4 IDCT SAMPLES FOR "x"

*FIG. 2A*

*FIG. 2B* x = ORIGINAL SAMPLES FOR FRAME-DCT
z = ORIGINAL SAMPLES FOR TOP FIELD-DCT
y = ORIGINAL SAMPLES FOR BOTTOM FIELD-DCT
∗ = 4 x 4 IDCT SAMPLES FOR "x"
● = 4 x 4 IDCT SAMPLES FOR "y"
▼ = 4 x 4 IDCT SAMPLES FOR "z"

FIG. 4 x = ORIGINAL SAMPLES FOR FRAME-DCT
z = ORIGINAL SAMPLES FOR TOP FIELD-DCT
y = ORIGINAL SAMPLES FOR BOTTOM FIELD-DCT
∗ = 4 x 4 IDCT SAMPLES FOR "x"
● = 4 x 4 IDCT SAMPLES FOR "y"
▸ = 4 x 4 IDCT SAMPLES FOR "z"

METHOD AND APPARATUS FOR RESIZING AN IMAGE FRAME INCLUDING FIELD-MODE ENCODING

This application claims the benefit of U.S. Provisional Application No. 60/084,632, filed May 7, 1998.

The invention relates to communications systems generally and, more particularly, the invention relates to a method and apparatus for resizing an image frame including field-mode encoding in an information stream decoder, such as an MPEG-like video decoder.

BACKGROUND OF THE DISCLOSURE

In several communications systems the data to be transmitted is compressed so that the available bandwidth is used more efficiently. For example, the Moving Pictures Experts Group (MPEG) has promulgated several standards relating to digital data delivery systems. The first, known as MPEG-1 refers to ISO/IEC standards 11172 and is incorporated herein by reference. The second, known as MPEG-2, refers to ISO/IEC standards 13818 and is incorporated herein by reference. A compressed digital video system is described in the Advanced Television Systems Committee (ATSC) digital television standard document A/53, and is incorporated herein by reference.

The above-referenced standards describe data processing and manipulation techniques that are well suited to the compression and delivery of video, audio and other information using fixed or variable length digital communications systems. In particular, the above-referenced standards, and other "MPEG-like" standards and techniques, compress, illustratively, video information using intra-frame coding techniques (such as run-length coding, Huffman coding and the like) and inter-frame coding techniques (such as forward and backward predictive coding, motion compensation and the like). Specifically, in the case of video processing systems, MPEG and MPEG-like video processing systems are characterized by prediction-based compression encoding of video frames with or without intra- and/or inter-frame motion compensation encoding.

It is known to compress (i.e., resize) image information to reduce decoder anchor frame memory requirements or to reduce decoder processing resources in systems utilizing relatively low resolution display devices. For example, in the case of an 8×8 block of DCT coefficients received by an MPEG-like decoder, it is known to consider only the 4×4 lower block of DCT coefficients (i.e., truncate the: three 4×4 higher order blocks), and to compute a 4×4 pixel block for storage as anchor frame information.

Unfortunately, present techniques for resizing images including field-mode coded DCT coefficients do not produce adequate results, especially if the images include both frame-mode and field-mode DCT coefficients. Therefore, it is seen to be desirable to provide a method and apparatus that addresses these and other problems in the art.

SUMMARY OF THE INVENTION

The invention comprises a method and apparatus for reducing information artifacts, such as phase error artifacts, imparted to a field-mode encoded video information stream during inverse discrete cosine transform (IDCT) processing within, e.g., an MPEG-like decoder producing a resized image frame(s) from an original image frame(s). That is, the invention adapts at least a portion of the DCT coefficients used during the IDCT processing such that pixel domain correction is imparted to the resized image frame(s) during the IDCT processing of the DCT-domain information forming the original image frame(s).

BRIEF DESCRIPTION OF THE DRAWINGS

The teachings of the present invention can be readily understood by considering the following detailed description in conjunction with the accompanying drawings, in which:

FIG. 2A is graphical representation of the relative spacing of samples of an frame-mode encoded original pixel block and superimposed samples of a pixel block resulting from a 4:1 resizing of the original pixel block;

FIG. 2B is graphical representation of the relative spacing of samples of a mixed frame-mode encoded and field-mode encoded original pixel block and superimposed samples of a pixel block resulting from a 4:1 resizing of the original pixel block;

FIG. 4 is graphical representation of the relative spacing of samples of a mixed frame-mode encoded and field-mode encoded original pixel block and superimposed samples of a pixel block resulting from a 4:1 resizing of the original pixel block according to the method of FIG. 3;

FIG. 6 is graphical representation of the relative spacing of samples of a mixed frame-mode encoded and field-mode encoded original pixel block and superimposed samples of a pixel block resulting from a 4:1 resizing of the original pixel block according to the method of FIG. 5.

To facilitate understanding, identical reference numerals have been used, where possible, to designate identical elements that are common to the figures.

DETAILED DESCRIPTION

Figure 1:
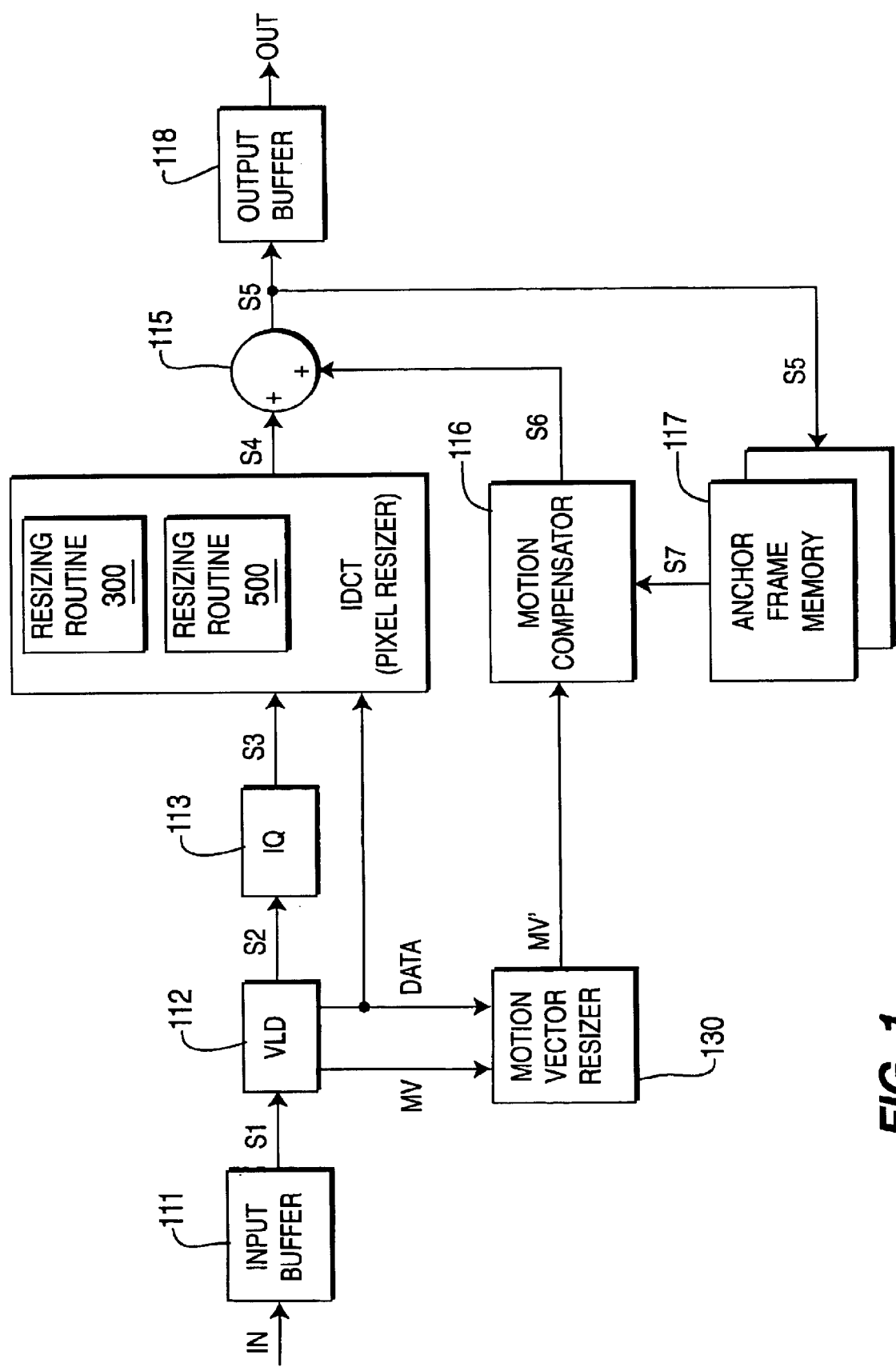
FIG. 1 depicts an embodiment of an MPEG-like decoder including apparatus according to the invention.

The invention will be described within the context of a video decoder, illustratively an MPEG-2 video decoding system that receives and decodes a compressed video information stream IN to produce a video output stream OUT. However, it will be apparent to those skilled in the art that the invention is applicable to any video processing system, including those systems adapted to DVB, MPEG-1, MPEG-2 and other information streams. Specifically, the invention is particularly well suited to any systems utilizing both frame-mode predicted macroblocks and field-mode predicted macroblocks, such as MPEG-2 video decoding systems.

FIG. 2A is graphical representation of the relative spacing of samples of an frame-mode encoded original pixel block and superimposed samples of a pixel block resulting from a 4:1 resizing of the original pixel block. Specifically, FIG. 2A depicts a frame-encoded 8×8 block of original pixel samples, where each original block sample is denoted by an "x". Superimposed over the 8×8 pixel block is a 4×4 pixel block comprising a 4:1 resized (i.e., compressed) version of the original 8×8 pixel block, where each resized block sample is denoted by an "*".

The resized pixel block is formed by processing the original 8×8 pixel block according to an 8×8 discrete cosine transform (DCT) to produce an 8×8 DCT coefficient block. After truncating (or ignoring) all DCT coefficients except the 4×4 DCT coefficient block representing the lower spatial frequencies of the original 8×8 pixel block, an inverse DCT is performed on the remaining 4×4 DCT coefficient block to produce the 4×4 resized pixel block. This DCT domain resizing technique works well for a video frame comprising only frame mode encoded macroblocks, such as presented in FIG. 2A. It must be noted that the IDCT used to produce the resized pixel block from the truncated DCT coefficient block may be performed as a two dimensional IDCT (i.e., a 2D N×N IDCT) or as two one-dimensional IDCTs (i.e., a 1-D N-point IDCT is computed for each of the N lines, and then a 1-D N-point IDCT is computed for each column of the result).

FIG. 2B is graphical representation of the relative spacing of samples of a mixed frame-mode encoded and field-mode encoded original pixel block and superimposed samples of a pixel block resulting from a 4:1 resizing of the original pixel block. Specifically, FIG. 2B depicts a 16×16 block of original pixel samples in which the "left" half of the samples (i.e., the leftmost two 8×8 macroblocks) have been frame-mode encoded while the "right" half of the samples (i.e., the rightmost two 8×8 macroblocks) have been field-mode encoded. The original frame-mode encoded samples are each denoted by an "x"; the original field-mode encoded sample associated with a top field are each denoted by a "z"; the original field-mode encoded sample associated with a bottom field are each denoted by a "z".

After processing the 16×16 block using the DCT domain resizing method described above with respect to FIG. 2A, an 8×8 resized pixel block is produces that includes correctly spaced pixel samples and incorrectly spaced pixel samples. Specifically, the resized samples associated with the frame-mode encoded pixel blocks (which are each denoted by a "*") are appropriately spaced with respect to the original samples (which are each denoted by a "x"). However, the resized samples associated with the field-mode encoded pixel blocks (which are each denoted by a "♥" for the top field and a "●" for the bottom field) are not appropriately spaced with respect to the original samples (which are each denoted by a "z" for the top field and a "y" for the bottom field). Moreover, the left and right resized blocks are not properly aligned (i.e., the "*" samples are not in the same row as the "♥" and "●" samples). These errors are present because the original field-mode encoded pixels within a particular field are vertically separated by two lines, unlike the original frame-mode encoded pixels which are vertically separated by only one line. Thus, there is a half picture element (pel) error introduced during the DCT domain resizing process.

It is important to note that in the case of a picture including only field-mode encoded macroblocks, the half pel error is less noticeable, since the half pel error is constant across the picture. However, where mixed frame-mode and filed-mode encoded macroblocks exist in a single picture (as depicted in FIG. 2B), the half pel error is extremely noticeable.

Furthermore, if the picture includes both field and frame macroblocks, the described distortion cannot be corrected by post-filtering the complete frame.

FIG. 1 depicts an embodiment of an MPEG-like decoder 100 according to the invention. Specifically, the decoder 100 of FIG. 1 receives and decodes a compressed video information stream IN to produce a video output stream OUT. The video output stream OUT is suitable for coupling to, e.g., a display driver circuit within a presentation device (not shown).

The MPEG-like decoder 100 comprises an input buffer memory module 111, a variable length decoder (VLD) module 112, an inverse quantizer (IQ) module 113, an inverse discrete cosine transform (IDCT) module 114, a summer 115, a motion compensation module 116, an output buffer module 118, an anchor frame memory module 117 and a motion vector (MV) resizer 130.

The input buffer memory module 111 receives the compressed video stream IN, illustratively a variable length encoded bitstream representing, e.g., a high definition television signal (HDTV) or standard definition television signal (SDTV) output from a transport demultiplexer/decoder circuit (not shown). The input buffer memory module 111 is used to temporarily store the received compressed video stream IN until the variable length decoder module 112 is ready to accept the video data for processing. The VLD 112 has an input coupled to a data output of the input buffer memory module 111 to retrieve, e.g., the stored variable length encoded video data as data stream S1.

The VLD 112 decodes the retrieved data to produce a constant length bit stream S2 comprising quantized prediction error DCT coefficients that is coupled to the IQ module 113. The VLD 112 also produces a motion vector stream MV that is coupled to the motion vector resizer 130, and a block information stream DATA that is coupled to the motion vector resizer 130 and the IDCT module 114.

The IQ module 113 performs an inverse quantization operation upon constant length bit stream S2 to produce a bit stream S3 comprising quantized prediction error DCT coefficients in a standard form.

The IDCT module 114 performs an inverse discrete cosine transform operation upon bit stream S3 to produce a reduced image size bitstream S4 comprising pixel-by-pixel prediction errors. Importantly, the IDCT operates, on a block by block basis, to reduce the size of the image represented by the information in bit stream S3. This size reduction is implemented by discarding (i.e., truncating) a portion of the DCT coefficients associated with each block prior to performing the IDCT operation. The operation of the IDCT module 114 will be described in more detail below with respect to FIG. 3 and FIG. 5. Briefly, in one embodiment described below with respect to FIG. 3, the IDCT processes, e.g., an 8×8 DCT coefficient block using a matrix that is slightly different than the standard matrix. The matrix used has been selected to impart a half pel vertical shift to those resized samples associated with field-mode encoding. In another embodiment of the invention described below with respect to FIG. 5, the IDCT processes, e.g., an 8×8 DCT coefficient block using one or more of a plurality of matrices that are slightly different than the standard matrix. The utilized matrix or matrices are used have been selected to impart a predetermined vertical shift to those resized samples associated with field-mode encoding depending upon whether, e.g., a top field or a bottom field is being processed.

The summer 115 adds the reduced image size pixel-by-pixel prediction error stream S4 to a motion compensated predicted pixel value stream S6 produced by the motion compensation module 116. Thus, the output of summer 115 is, in the exemplary embodiment, a reduced size video stream S5 comprising reconstructed pixel values. The reduced size video stream S5 produced by summer 115 is coupled to the anchor frame memory 117 and the output buffer module 118.

The anchor frame memory module 117 receives and stores the compressed video stream S5. Advantageously, the size of the anchor frame memory module 117 may be reduced by an amount consistent with the compression ratio utilized.

The motion vector resizer 130 receives the motion vector stream MV and block information stream DATA from the VLD 112. The motion vector stream MV comprises motion vector information to be used by the motion compensation module 116 to predict individual macroblocks based upon image information stored in the anchor frame memory module. However, since the image information stored in the anchor frame memory module 117 has been scaled by the IDCT module 116, it is also necessary to scale motion vector data used to predict macroblocks using the scaled pixel information. The scaled motion vectors MV are coupled to the motion compensation module 116 via path MV'.

The motion compensation module 116 accesses the compressed (i.e., scaled) image information stored in memory module 117 via signal path S7 and the scaled motion vector(s) MV' to produce a scaled predicted macroblock. That is, the motion compensation module 116 utilizes one or more stored anchor frames (e.g., the reduced resolution pixel blocks generated with respect to the most recent I-frame or P-frame of the video signal produced at the output of the summer 115), and the motion vector(s) MV' received from the motion vector resizer 130, to calculate the values for each of a plurality of scaled predicted macroblocks forming a scaled predicted information stream.

Figure 3:
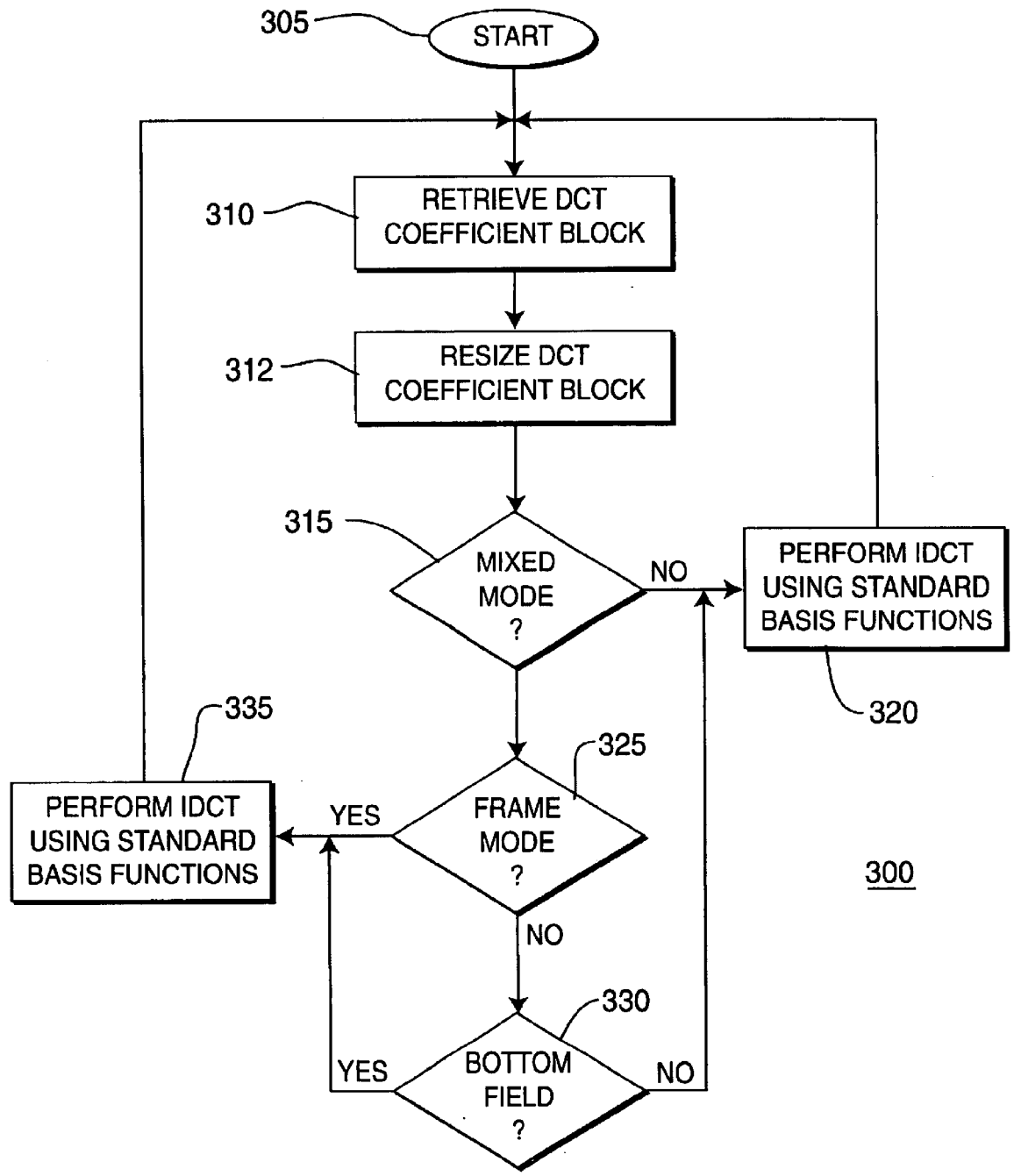
FIG. 3 depicts a flow diagram of a method for performing an inverse discrete cosine transform routine suitable for use in the MPEG-like decoder of FIG. 1.

FIG. 3 depicts a flow diagram of a method for performing an inverse discrete cosine transform routine suitable for use in the MPEG-like decoder of FIG. 1. The method 300 of FIG. 3 is suitable for use in, e.g., the IDCT module 116 of the MPEG-like decoder of FIG. 1.

The IDCT routine 300 is entered at step 305 and proceeds to step 310, where DCT coefficients representative of a pixel block are received by, e.g., the IDCT module 116 of FIG. 1. The routine 300 then proceeds to step 312, where the DCT coefficients representative of the received pixel block are truncated in accordance with the resizing or scaling to be imparted to the image or picture including the represented pixel block. For example, if the received DCT coefficients comprise an 8×8 DCT coefficient block representative of an 8×8 pixel block, and the resized image or picture is to be ¼ the resolution of the original picture or image (i.e., vertical and horizontal information reduced by ½ each), then all the received DCT coefficients except the 4×4 DCT coefficient "sub-block" representing lower vertical and horizontal spatial frequency information are truncated. The routine 300 then proceeds to step 315.

At step 315 a query is made as to whether the received DCT coefficients were encoded according to a "mixed mode" DCT encoding regime. That is, a query is made to determine if the pixel block represented by the received DCT coefficients is part of an image or picture that was encoded using both field-mode and frame-mode DCT encoding. If the query at step 315 is answered negatively (i.e., frame-mode only or field mode only), then the routine 300 proceeds to step 320. If the query at step 315 is answered affirmatively (i.e., mixed frame-mode and field mode encoding), then the routine 300 proceeds to step 325.

At step 320, the routine 300 performs an IDCT of the truncated DCT coefficients using DCT basis functions (e.g., as defined by the coefficient matrix) that are standard for the size of the pixel block represented by the received DCT coefficients and the resizing imparted to the image or picture including the represented pixel block. Table 1 depicts an IDCT coefficient matrix suitable for use performing an IDCT operation on a 4×4 DCT coefficient block to produce a 4×4 pixel block.

TABLE 1

| 0.5000 | 0.6533  | 0.5000  | 0.2706  |
|--------|---------|---------|---------|
| 0.5000 | 0.2706  | −0.5000 | −0.6533 |
| 0.5000 | −0.2706 | −0.5000 | 0.6533  |
| 0.5000 | −0.6533 | 0.5000  | 0.2706  |

It must be noted that an IDCT transform may be expressed as a matrix multiplication. For example, if X is the DCT transform of a signal x, D is the DCT coefficients matrix used in that DCT transform, and D' is the inverse, then the following mathematical relationships are established:

$$X = D'xD \quad \text{(equation 1)}$$

$$x = DXD' \quad \text{(equation 2)}$$

Thus, at step 320 (for the case of a 4×4 DCT coefficient matrix) the truncated DCT coefficient block (X) is pre-multiplied by matrix D and post-multiplied by the inverse of matrix D (i.e., D') to produce a 4×4 pixel block (x), which is then coupled to, e.g., adder 115 as reduced image size bitstream S4. The routine 300 then proceeds to step 310, where the next DCT coefficient block is received.

At step 325 a query is made as to whether the particular "mixed-mode" DCT coefficient block received at step 310 comprises a frame-mode coded DCT coefficient block. If the query at step 315 is answered negatively, then the routine 300 proceeds to step 330. If the query at step 315 is answered affirmatively, then the routine 300 proceeds to step 335.

At step 330 a query is made as to whether the particular field-mode DCT coefficient block received at step 310 is part of a bottom field. If the query at step 330 is answered affirmatively (i.e., the DCT coefficient block includes bottom field information), then the routine 300 proceeds to step 335. If the query at step 315 is answered negatively (i.e., the DCT coefficient block includes top field information), then the routine 300 proceeds to step 320.

At step 335, the routine 300 performs an IDCT of the truncated DCT coefficients using basis functions (as defined by the coefficient matrix D) that are modified such that a vertical pixel-domain shift is imparted to the resulting pixel block produced by the IDCT module 116. Continuing with the above example of an 8×8 DCT coefficient block reduced to a 4×4 DCT coefficient block for resizing the image or picture represented by that block, to obtain a different sampling pattern in the vertical direction such that a corrective shift may be made to compensate for the field-mode DCT coding (e.g., the ½ pel error discussed above with respect to FIG. 2B), an alternate pre-multiplication matrix (denoted as matrix "E" by the inventors) is used, as shown below with respect to equation 3.

$$x2 = EXD' \quad \text{(equation 3)}$$

Therefore, to obtain a pixel block x2 including the appropriate ½ pel (original resolution) vertical shift downward, the alternate matrix E corresponds to a slightly skewed sub-sampling of the 8 point DCT basis functions. That is, the entries in Table 2 are samples of an 8-point IDCT matrix selected to impart, illustratively, a ½ pel shift vertically downward in the original pixel domain resolution.

TABLE 2

| 0.5000 | 0.5878  | 0.2706  | −0.1379 |
|--------|---------|---------|---------|
| 0.5000 | 0.1379  | −0.6532 | −0.3928 |
| 0.5000 | −0.3928 | −0.2706 | 0.6934  |
| 0.5000 | −0.6934 | 0.6532  | −0.5878 |

Thus, at step 335 (for the case of a 4×4 DCT coefficient matrix) the truncated DCT coefficient block (X) is pre-multiplied by matrix E and post-multiplied by the transpose of matrix D (i.e., D') to produce a 4×4 pixel block (2x), which is then coupled to, e.g., adder 115 as reduced image size bitstream S4. The routine 300 then proceeds to step 310, where the next DCT coefficient block is received.

The alternate matrix E depicted above in Table 2 may be used to compensate for the pixel misalignment described above with respect to FIG. 2B by shifting down some pixel positions by half pel in vertical direction. More precisely, it can be used to compute the modified IDCT for the frame-DCT and for the bottom field DCT in field-DCT mode.

FIG. 4 is graphical representation of the relative spacing of samples of a mixed frame-mode encoded and field-mode encoded original pixel block and superimposed samples of a pixel block resulting from a 4:1 resizing of the original pixel block according to the method of FIG. 3. Specifically, FIG. 4 depicts a 16×16 block of original pixel samples in which the "left" half of the samples (i.e., the leftmost two 8×8 macroblocks) have been frame-mode encoded while the "right" half of the samples (i.e., the rightmost two 8×8 macroblocks) have been field-mode encoded. The original frame-mode encoded samples are each denoted by an "x"; the original field-mode encoded sample associated with a top field are each denoted by a "z"; the original field-mode encoded sample associated with a bottom field are each denoted by a "z".

After processing the 16×16 block using the DCT domain resizing method described above with respect to FIG. 3, an 8×8 resized pixel block is produces that includes correctly aligned pixel samples that are incorrectly spaced with respect to the original pixel samples. Specifically, the resized samples associated with the frame-mode encoded pixel blocks (which are each denoted by a "*") and the resized samples associated with the bottom field-mode encoded pixel blocks (which are each denoted by a "●") have been shifted vertically downward by a ½ pel, while the resized samples associated with the top field-mode encoded pixel blocks (which are each denoted by a "♥") are in the same position as previously depicted with respect to FIG. 2B. Thus, the method 300 of FIG. 3 addresses the pixel alignment problem such that an image or picture represented by the received "mixed mode" DCT coefficient blocks will avoid artifacts due to pixel alignment errors (i.e., phase errors).

However, while the method 300 of FIG. 3 provides an efficient solution to the phase error problem, it must be noted that the method 300 does shift the actual position of the reconstructed pixel blocks to the border of the blocks. Thus, in applications where proximity to the pixel border results in additional artifacts, the method 300 of FIG. 3 will need to be modified to avoid such "blocking" artifacts.

Figure 5:
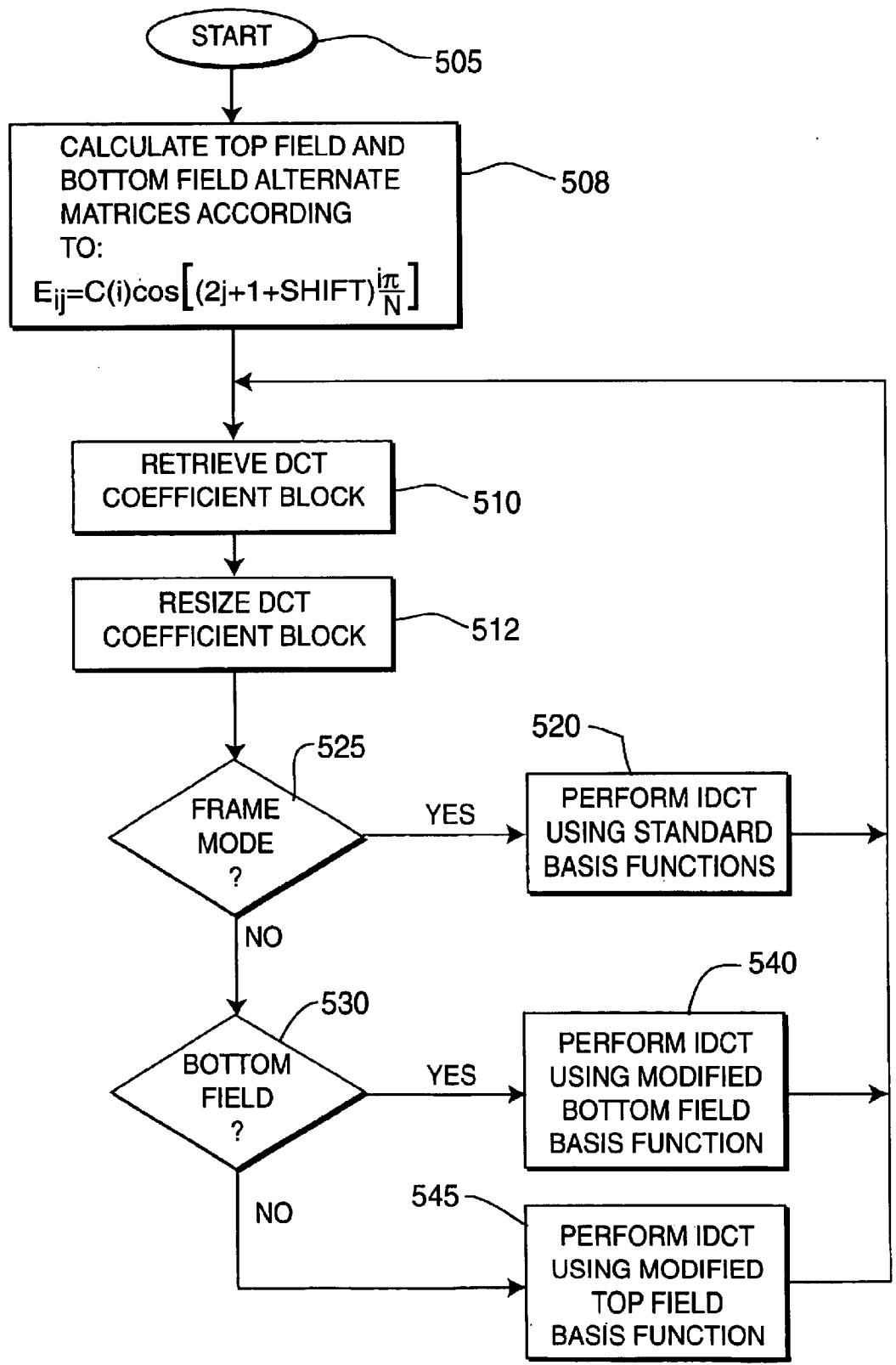
FIG. 5 depicts a flow diagram of a method for performing an inverse discrete cosine transform routine suitable for use in the MPEG-like decoder of FIG. 1.

FIG. 5 depicts a flow diagram of a method for performing an inverse discrete cosine transform routine suitable for use in the MPEG-like decoder of FIG. 1. The method 500 of FIG. 5 is suitable for use in, e.g., the IDCT module 116 of the MPEG-like decoder of FIG. 1. Specifically, the method 500 of FIG. 5 compensates for the border block problem described above with respect to FIG. 3 by providing phase error correction of "mixed mode" DCT coefficient blocks without shifting the reconstructed pixels to the border of their respective blocks.

The IDCT routine 500 is entered at step 505 and proceeds to step 508, where top field and bottom field alternate IDCT matrices (E) are calculated according to the amount of vertical shifting to be imparted to the top and bottom fields pixels. The top and bottom alternate coefficient matrices ($E_T$ and $E_B$, respectively) are calculated such that IDCT performed on the DCT coefficient blocks representing the respective fields will yield pixel blocks that are properly aligned and without phase error. Consider the case discussed above with respect to FIG. 3 and shown in FIG. 2B (i.e., the 8×8 to 4×4 block resizing case). If the bottom field pixel information represented by field-mode coded DCT coefficients is vertically shifted down by ½ pel original pixel domain resolution, and the top field pixel information represented by field-mode coded DCT coefficients is vertically shifted up by ½ pel original pixel domain resolution, then the resulting pixel blocks will be properly positioned with respect to the pixel information represented by frame-mode coded DCT coefficients. It must be noted that since the field-mode DCT coefficients have half the resolution, the amount of shifting must be scaled accordingly (i.e., a ½ pel original pixel domain shift corresponds to a ¼ pel shift of field-mode data). Since the corresponding alternate matrix samples for top and bottom field-mode information do not correspond to sub-samples of a higher order IDCT coefficient (as in the example of FIG. 3), the new alternate matrices $E_T$ and $E_B$ are calculated (at step 508) according to equation 4 (below), where:

i and j are the column and row position of a matrix element;

SHIFT is the desired shift in the original domain resolution (in pels);

N is the original DCT size (e.g., 8 denotes an 8×8 DCT coefficient block);

C(i) is a constant defined as:
C(i)=0.5 for i=0; and
C(i)=1/√2 otherwise.

$$E_{ij} = C(i) \times \cos\left[(2j + 1 + SHIFT) \times i\frac{\pi}{N}\right] \quad \text{(equation 4)}$$

Thus, equation 4 provides a general solution to the alternate matrix calculation. For example, for the desired quarter pel shift upward in DCT resolution domain (to be used with top-field DCT), the matrix $E_T$ is calculated using equation 4 to produce the matrix shown below in Table 3. Similarly, for the desired half pel shift downward in DCT resolution domain (to be used with bottom-field DCT), the matrix $E_B$ is calculated using equation 4 to produce the matrix shown below in Table 4. Thus, by replacing the original IDCT matrix D for the above matrices in the pre-multiplication portion of the IDCT processing step, the desired shifting in pixel position is obtained.

It should be noted that while the values within Table 2 may be obtained by sub-sampling the original 8×8 basis functions (e.g., the matrix coefficients), the values within Tables 3 and 4 do not correspond to a sub-sampling of the original DCT coefficients. That is, the values within Tables 3 and 4 require a sampling of the continuous domain basis functions as expressed in equation 4 at the desired sampling points.

TABLE 3

| | | | |
|---|---|---|---|
| 0.5000 | 0.6766 | 0.5878 | 0.4485 |
| 0.5000 | 0.3333 | −0.3928 | −0.7036 |
| 0.5000 | −0.2052 | −0.5878 | 0.5465 |
| 0.5000 | −0.6235 | 0.3928 | −0.0693 |

TABLE 4

| | | | |
|---|---|---|---|
| 0.5000 | 0.6235 | 0.3928 | 0.0693 |
| 0.5000 | 0.2052 | −0.5878 | −0.5465 |
| 0.5000 | −0.3333 | −0.3928 | 0.7036 |
| 0.5000 | −0.6766 | 0.5878 | −0.4485 |

After calculating the top and bottom field matrices $E_T$ and $E_B$ at step 508, the routine 500 proceeds to step 510, where DCT coefficients representative of a pixel block are received by, e.g., the IDCT module 116 of FIG. 1. The routine 500 then proceeds to step 512, where the DCT coefficients representative of the received pixel block are resized (e.g., truncated) in accordance with the resizing or scaling to be imparted to the image or picture including the represented pixel block. The routine 500 then proceeds to step 525.

At step 525 a query is made as to whether the received DCT coefficient block comprises a frame-mode coded DCT coefficient block. If the query at step 525 is answered affirmatively, then the routine 500 proceeds to step 520. If the query at step 525 is answered negatively (i.e., field-mode DCT coding used), then the routine 500 proceeds to step 530.

At step 520, the routine 500 performs an IDCT of the resized (e.g., truncated) DCT coefficients using basis functions (as defined by the coefficient matrix) that are standard for the size of the pixel block represented by the received DCT coefficients and the resizing imparted to the image or picture including the represented pixel block. Table 1 depicts an IDCT coefficient matrix suitable for use performing an IDCT operation on a 4×4 DCT coefficient block to produce a 4×4 pixel block. The routine 500 then proceeds to step 510, where the next DCT coefficient block is received.

At step 530 a query is made as to whether the received field-mode coded DCT coefficient block comprises a bottom field block. If the query at step 530 is answered affirmatively, then the routine 500 proceeds to step 540. If the query at step 530 is answered negatively, then the routine 500 proceeds to step 545.

At step 540, the routine 500 performs an IDCT of the resized bottom field DCT coefficients using the basis function defined by the coefficient matrix $E_B$ previously calculated at step 508. Table 4 depicts an IDCT coefficient matrix suitable for use performing an IDCT operation on a 4×4 field-mode coded (bottom field) DCT coefficient block to produce a 4×4 pixel block. The routine 500 then proceeds to step 510, where the next DCT coefficient block is received.

At step 545, the routine 500 performs an IDCT of the resized top field DCT coefficients using the basis function defined by the coefficient matrix $E_T$ previously calculated at step 508. Table 3 depicts an IDCT coefficient matrix suitable for use performing an IDCT operation on a 4×4 field-mode coded (top field) DCT coefficient block to produce a 4×4 pixel block. The routine 500 then proceeds to step 510, where the next DCT coefficient block is received.

FIG. 6 is graphical representation of the relative spacing of samples of a mixed frame-mode encoded and field-mode encoded original pixel block and superimposed samples of a pixel block resulting from a 4:1 resizing of the original pixel block according to the method of FIG. 5. Specifically, FIG. 6 depicts a 16×16 block of original pixel samples in which the "left" half of the samples (i.e., the leftmost two 8×8 macroblocks) have been frame-mode encoded while the "right" half of the samples (i.e., the rightmost two 8×8 macroblocks) have been field-mode encoded. The original frame-mode encoded samples are each denoted by an "x"; the original field-mode encoded sample associated with a top field are each denoted by a "z"; the original field-mode encoded sample associated with a bottom field are each denoted by a "z".

After processing the 16×16 block using the DCT domain resizing method described above with respect to FIG. 5, an 8×8 resized pixel block is produces that includes correctly aligned pixel samples that are correctly spaced with respect to the original pixel samples. Specifically, the resized samples associated with the frame-mode encoded pixel blocks (which are each denoted by a "*") have not been shifted, the resized samples associated with the bottom field-mode encoded pixel blocks (which are each denoted by a "●") have been shifted vertically downward by a ½ pel, and the resized samples associated with the top field-mode encoded pixel blocks (which are each denoted by a "♥") have been shifted upward by ¼ pel. Thus, the method 500 of FIG. 5 addresses the pixel alignment problem such that an image or picture represented by the received "mixed mode" DCT coefficient blocks will avoid artifacts due to pixel alignment errors (i.e., phase errors) and without producing block border artifacts.

While the invention has been described primarily in terms of scaling motion vectors and pixel domain information by a factor of two, it must be noted that the invention is well suited to other scaling factors (integer and non-integer). For example, In FIG. 6, where the new resolution is one half of the original resolution, the bottom field, field-mode sample is vertically shifted downward by a half pel (original resolution), and the top field, field-mode sample is vertically shifted upward by a half pel (original resolution) to properly align the frame-mode and field-mode samples. Similarly, if the new resolution is one fourth of the original resolution, the bottom field, field-mode sample is vertically shifted downward by a ³⁄₂ pel (original resolution), and the top field, field-mode sample is vertically shifted upward by a ³⁄₂ pel (original resolution) to properly align the frame-mode and field-mode samples.

Moreover, while the invention has been described primarily in terms of scaling down (i.e., reducing pixel domain information prior to storage), the invention is well suited to scaling up (i.e., increasing pixel domain information). Such scaling up of pixel domain information and motion vector information is especially applicable to applications requiring the presentation of low resolution image information using a high resolution display device. For example, the presentation of standard definition television (SDTV) on a high definition television (HDTV) display device. One skilled in the art and informed by the teachings of the present invention will readily devise additional and various modifications to the above-described embodiments of the invention.

The present invention can be embodied in the form of computer-implemented processes and apparatuses for practicing those processes. The present invention also can be embodied in the form of computer program code embodied in tangible media, such as floppy diskettes, CD-ROMs, hard drives, or any other computer readable storage medium, wherein, when the computer program code is loaded into and executed by a computer, the computer becomes an apparatus for practicing the invention. The present invention can also be embodied in the form of computer program code, for example whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Although various embodiments which incorporate the teachings of the present invention have been shown and described in detail herein, those skilled in the art can readily devise many other varied embodiments that still incorporate these teachings.

What is claimed is:

1. A method for decoding a compressed image stream including discrete cosine transform (DCT) coefficient blocks representative of pixel blocks having a first resolution, said method comprising the steps of:
   resizing a DCT coefficient block, said resized DCT coefficient block being representative of a pixel block having a second resolution;
   transforming, according to an inverse discrete cosine transform (IDCT), said resized DCT coefficient block to produce said pixel block having said second resolution, said step of transforming utilizing DCT basis functions adapted in response to an encoding mode of said DCT coefficient block.

2. The method of claim 1, wherein said DCT basis functions are further adapted in response to a relationship between said first resolution and second resolution.

3. The method of claim 1, wherein said step of transforming causes pixel domain information derived from field-mode DCT information to be appropriately aligned with pixel information derived from frame-mode DCT information.

4. The method of claim 3, wherein said appropriate alignment comprises a vertical alignment.

5. The method of claim 1, wherein said step of transforming comprises the steps of:
   determining if a frame of DCT coefficient blocks including said DCT coefficient block has been encoded according to a single encoding mode; and
   in the case of said frame of DCT coefficient blocks being encoded according to a single encoding mode:
      utilizing a default set of DCT basis functions;
   in the case of said frame of DCT coefficient blocks not being encoded ccording to a single encoding mode:
      utilizing said default set of DCT basis functions if said DCT encoding mode comprises a field-mode encoding mode and said DCT coefficient block represents a bottom field pixel block;
      utilizing a modified set of DCT basis functions if said DCT encoding mode comprises a frame-mode encoding mode; and
      utilizing said modified set of DCT basis functions if said DCT encoding mode comprises a field-mode encoding mode and said DCT coefficient block represents a top field pixel block.

6. The method of claim 5, wherein said modified set of DCT basis functions comprises a set of DCT basis functions selected to impart a desired amount of pixel domain shift.

7. The method of claim 6, wherein said modified set of DCT basis functions is derived by sampling a continuous set of DCT basis functions at sampling intervals selected to impart a vertical shift.

8. The method of claim 5, wherein:
said default set of DCT basis functions is represented by a first matrix;
said set of DCT basis functions derived by sub-sampling said default set of DCT basis functions is represented by a second matrix; and
said second matrix is selected to impart a vertical shifting of said pixel block having said second resolution.

9. The method of claim 8, wherein:
said second resolution is one fourth of said first resolution; and
said second matrix is selected to impart a ¾ picture element (pel), with respect to said first resolution, vertical shifting of said pixel block having said second resolution.

10. The method of claim 8, wherein:
said second resolution is one half of said first resolution; and
said second matrix is selected to impart a half pel, with respect to said first resolution, vertical shifting of said pixel block having said second resolution.

11. The method of claim 1, wherein said step of transforming comprises the steps of:
   determining if said DCT coefficient block has been encoded according to a frame-mode encoding mode or a field-mode encoding mode; and
   in the case of said DCT coefficient block having been encoded according to said frame-mode encoding mode:
      performing said IDCT using a default set of DCT basis functions;
   in the case of said DCT coefficient block having been encoded according to said field-mode encoding mode:
      performing, in the case of said DCT coefficient block representing a top field pixel block, said IDCT using a first modified set of DCT basis functions; and
      performing, in the case of said DCT coefficient block representing a bottom field pixel block, said IDCT using a second modified set of DCT basis functions.

12. The method of claim 11, wherein:
said first modified set of DCT basis functions comprises said default set of DCT basis functions multiplied by a first set of DCT basis functions derived by sub-sampling said default set of DCT basis functions;
said second modified set of DCT basis functions comprises said default set of DCT basis functions multiplied by a second set of DCT basis functions derived by sub-sampling said default set of DCT basis functions.

13. The method of claim 11, wherein:
said default set of DCT basis functions is represented by a first matrix;
said first set of DCT basis functions derived by sub-sampling said default set of DCT basis functions is represented by a second matrix;
said second set of DCT basis functions derived by sub-sampling said default set of DCT basis functions is represented by a third matrix;
said second and third matrices are selected to impart a vertical shifting of said pixel block having said second resolution.

14. The method of claim 13, wherein:
said second resolution is one fourth of said first resolution;
said second matrix is selected to impart a half picture element (pel) vertical shifting of said pixel block having said second resolution; and said third matrix is selected to impart a quarter pel vertical shifting of said pixel block having said second resolution.

15. The method of claim 13, wherein:

said second resolution is one half of said first resolution;

said second matrix is selected to impart a quarter pel vertical shifting of said pixel block having said second resolution; and said third matrix is selected to impart an eighth pel vertical shifting of said pixel block having said second resolution.

16. The method of claim 11, wherein:

said step of resizing comprises the step of truncating, from said DCT coefficient block, a plurality of DCT coefficients representative of either higher order vertical spatial frequency components or higher order horizontal spatial frequency components.

17. The method of claim 11, wherein:

said step of resizing comprises the step of adding, to said DCT coefficient block, one or more DCT coefficients.

18. The method of claim 1, wherein:

said step of resizing comprises the step of truncating, from said DCT coefficient block, a plurality of DCT coefficients representative of higher order vertical and horizontal spatial frequency components.

19. The method of claim 1, wherein:

said step of resizing comprises the step of adding, to said DCT coefficient block, one or more DCT coefficients.

20. Apparatus for decoding a compressed image stream including discrete cosine transform (DCT) coefficient blocks representative of pixel blocks having a first resolution, said apparatus comprising:

an inverse discrete cosine transform (IDCT) processor;

said IDCT processor resizing a DCT coefficient block to produce a resized DCT coefficient block representative of a pixel block having a second resolution; and said IDCT processor transforming, according to an inverse discrete cosine transform (IDCT) utilizing DCT basis functions adapted in response to an encoding mode of said DCT coefficient block, said resized DCT coefficient block to produce said pixel block having said second resolution.

21. The apparatus of claim 20, wherein said DCT basis functions are further adapted in response to a relationship between said first resolution and second resolution.

22. The apparatus of claim 20, wherein:

said IDCT processor determines if a frame of DCT coefficient blocks including said DCT coefficient block has been encoded according to a single encoding mode; and in the case of said frame of DCT coefficient blocks being encoded according to a single encoding mode:
said IDCT processor utilizes a default set of DCT basis functions;

in the case of said frame of DCT coefficient blocks not being encoded according to a single encoding mode:
said IDCT processor utilizes said default set of DCT basis functions if said DCT encoding mode comprises a field-mode encoding mode and said DCT coefficient block represents a bottom field pixel block;
said IDCT processor utilizes a modified set of DCT basis functions if said DCT encoding mode comprises a frame-mode encoding mode; and said IDCT processor utilizes said modified set of DCT basis functions if said DCT encoding mode comprises a field-mode encoding mode and said DCT coefficient block represents a top field pixel block.

23. The method of claim 22, wherein said modified set of DCT basis functions is derived by sampling a continuous set of DCT basis functions at sampling intervals selected to impart a vertical shift.

24. The apparatus of claim 22, wherein:

said default set of DCT basis functions is represented by a first matrix;

said set of DCT basis functions derived by sub-sampling said default set of DCT basis functions is represented by a second matrix; and said second matrix is selected to impart a vertical shifting of said pixel block having said second resolution.

25. The apparatus of claim 24, wherein:

said second resolution is one fourth of said first resolution; and said second matrix is selected to impart a ¾ picture element (pel), with respect to said first resolution, vertical shifting of said pixel block having said second resolution.

26. The apparatus of claim 24, wherein:

said second resolution is one half of said first resolution; and said second matrix is selected to impart a half pel, with respect to said first resolution, vertical shifting of said pixel block having said second resolution.

27. The apparatus of claim 20, wherein said adapted DCT basis functions comprises a set of DCT basis functions selected to impart a desired amount of pixel domain shift.

28. The apparatus of claim 20, wherein:

said IDCT processor determines if said DCT coefficient block has been encoded according to a frame-mode encoding mode or a field-mode encoding mode; and in the case of said DCT coefficient block having been encoded according to said frame-mode encoding mode:
said IDCT processor utilizes a default set of DCT basis functions;

in the case of said DCT coefficient block having been encoded ccording to said field-mode encoding mode:
said IDCT processor, in the case of said DCT coefficient block representing a top field pixel block, utilizes a first modified set of DCT basis functions; and said IDCT processor, in the case of said DCT coefficient block representing a bottom field pixel block, utilizes a second modified set of DCT basis functions.

29. The apparatus of claim 28, wherein:

said first modified set of DCT basis functions comprises said default set of DCT basis functions multiplied by a first set of DCT basis functions derived by sub-sampling said default set of DCT basis functions;

said second modified set of DCT basis functions comprises said default set of DCT basis functions multiplied by a second set of DCT basis functions derived by sub-sampling said default set of DCT basis functions.

30. The apparatus of claim 28, wherein:

said default set of DCT basis functions is represented by a first matrix;

said first set of DCT basis functions derived by sub-sampling said default set of DCT basis functions is represented by a second matrix;

said second set of DCT basis functions derived by subsampling said default set of DCT basis functions is represented by a third matrix;

said second and third matrices are selected to impart a vertical shifting of said pixel block having said second resolution.

31. The apparatus of claim 20, wherein:

said second resolution is one fourth of said first resolution;

said second matrix is selected to impart a half picture element (pel) vertical shifting of said pixel block having said second resolution; and said third matrix is selected to impart a quarter pel vertical shifting of said pixel block having said second resolution.

32. The apparatus of claim 20, wherein:

said second resolution is one half of said first resolution;

said second matrix is selected to impart a quarter pel vertical shifting of said pixel block having said second resolution; and said third matrix is selected to impart an eighth pel vertical shifting of said pixel block having said second resolution.

\* \* \* \* \*

UNITED STATES PATENT AND TRADEMARK OFFICE
CERTIFICATE OF CORRECTION

PATENT NO. : 6,792,149 B1
DATED : September 14, 2004
INVENTOR(S) : Dinei Afonso Ferreira Florencio It is certified that error appears in the above-identified patent and that said Letters Patent is hereby corrected as shown below:

Column 13,
Lines 12 and 18, change "claim 11" to -- claim 1 --.

Column 15,
Line 21, change "claim 1" to -- claim 11 --.

Column 19,
Line 26, change "claim 1" to -- claim 11 --.

Signed and Sealed this

Twenty-seventh Day of December, 2005

JON W. DUDAS
*Director of the United States Patent and Trademark Office*